(12) United States Patent
Karthick D O

(10) Patent No.: US 11,354,228 B1
(45) Date of Patent: Jun. 7, 2022

(54) AUTOMATED EXPLORATORY TESTING USING MACHINE LEARNING

(71) Applicant: SAP SE, Walldorf (DE)

(72) Inventor: Manoj Karthick D O, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/196,813

(22) Filed: Mar. 9, 2021

(51) Int. Cl.
  G06F 11/36 (2006.01)
  G06N 3/04 (2006.01)
  G06F 8/73 (2018.01)

(52) U.S. Cl.
  CPC ............ *G06F 11/3688* (2013.01); *G06F 8/73* (2013.01); *G06F 11/3676* (2013.01); *G06F 11/3692* (2013.01); *G06F 11/3696* (2013.01); *G06N 3/04* (2013.01)

(58) Field of Classification Search
  CPC ............ G06F 11/3688; G06F 11/3692; G06F 11/3676; G06F 8/73; G06F 11/3696; G06N 3/04
  See application file for complete search history.

(56) References Cited

U.S. PATENT DOCUMENTS

| | | | | |
|---|---|---|---|---|
| 2013/0191814 A1* | 7/2013 | Fujii | ................... | G06F 11/3684 717/124 |
| 2019/0156249 A1* | 5/2019 | Nakata | .................. | G06N 3/0454 |
| 2020/0004667 A1* | 1/2020 | Seshadri | ................. | G06F 11/36 |
| 2020/0117580 A1* | 4/2020 | Lekivetz | ............. | G06F 11/3684 |

OTHER PUBLICATIONS

Schaefer et al., "Model-Based Exploratory Testing: A Controlled Experiment," *IEEE Seventh International Conference on Software Testing, Verification, and Validation Workshops*, 10 pages, 2014.
Hourani et al., "The Impact of Artificial Intelligence on Software Testing," *IEEE Jordan International Joint Conference on Electrical Engineering and Information Technology (JEEIT)*, 6 pages, 2019.
Durelli et al.,"Machine Learning Applied to Software Testing:A Systematic Mapping Study," *IEEE Transactions on Reliability*, vol. 68, No. 3, 24 pages, Sep. 2019.

* cited by examiner

*Primary Examiner* — Wei Y Zhen
*Assistant Examiner* — Amir Soltanzadeh
(74) *Attorney, Agent, or Firm* — Klarquist Sparkman, LLP

(57) ABSTRACT

Technologies are provided for automated exploratory testing using machine learning. In response to receiving an identifier for an application to be tested, a machine learning model can be generated that can be used to automate exploratory testing of the application. The machine learning model can be generated based on test scenarios associated with the application and user interface controls of the application. The machine learning model can comprise one or more data structures that model relationships between user interface control values and application functionality defined by the test scenarios. The machine learning model can be used to generate exploratory testing operations targeting the application. In at least some embodiments, the machine learning model comprises an artificial neural network comprising input layer nodes associated with user interface controls and/or hidden layer nodes associated with application test scenarios.

12 Claims, 8 Drawing Sheets

```
                610
       <mvc:View    619
          controllerName="example.controller.App"
          xmlns="ex.m"
          xmlns:mvc="ui.core.mvc">
          <Button
      611    text="Submit"    621
             press=".onSubmit"/>
          <Input
      613    value="{/sender/name}"
             description="{/sender/name}"
             type="userid"/>
          <Input
      615    value="{/recipient/name}"
             description="{/recipient/name}"
             type="userid"/>
          <Input
      617    value="{/amount}"
             description="{/amount}"
             type="currency"/>
       </mvc:View>

620
       ui.define([
          "ui/core/mvc/Controller",
          "m/MessageToast",
          "ui/model/json/JSONModel"    623
       ], function (Controller, JSONModel) {
                                                   619
          "use strict";
          return Controller.extend("example.controller.App", {
             onSubmit : function () {
      621       post(
                                      625
                    {/sender/name},
                    {/recipient/name},
                    {/amount});
             }
          });
       });
```

AUTOMATED EXPLORATORY TESTING USING MACHINE LEARNING

BACKGROUND

As computer applications have increased in scope and complexity, software developers and quality assurance professionals have begun to make use of automated testing techniques to reduce the time that is required for unit testing and regression testing operations. However, manual testing still remains a prominent part of many software quality assurance regiments. One manual task that is performed by may many human testers is exploratory testing. Rather than performing rote test scripts, in exploratory testing a tester probes an application's functionality, looking for bugs and errors. Since exploratory testing is not confined to predefined test cases, it has the opportunity to identify bugs caused by behavior which the developers had not anticipated. However, due to its improvisational nature, exploratory testing remains a time consuming process that is only performed by human testers.

Therefore, there is room for improvement in technologies for automating exploratory testing operations.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In an example embodiment, a method comprises receiving an application identifier from a user computing device; generating a machine learning model using a plurality of test scenarios associated with the application identifier and a plurality of user interface controls of an application associated with the application identifier; performing exploratory testing of the application using the generated machine learning model; and transmitting results of the exploratory testing to the user computing device.

In another example embodiment, a system comprises a first server computer executing an application, wherein the application is configured to process requests received via a computer network, and transmit responses via the computer network. The system further comprises a second server computer configured to receive an application identifier associated with the application via the computer network; generate a machine learning model using a plurality of test scenarios associated with the application identifier and a plurality of user interface controls of the application; perform exploratory testing of the application using the generated machine learning model, wherein the exploratory testing comprises transmitting test requests to the application via the computer network and receiving responses from the application via the computer network; and transmit results of the exploratory testing via the computer network.

In another example embodiment, one or more computer-readable storage media store instructions that, when executed by one or more processors, cause the one or more processors to perform operations, the operations comprising receiving an application identifier from a user computing device; generating a machine learning model using a plurality of test scenarios associated with the application identifier and a plurality of user interface controls of an application associated with the application identifier; performing exploratory testing of the application using the generated machine learning model; and transmitting results of the exploratory testing to the user computing device.

As described herein, a variety of other features and advantages can be incorporated into the technologies as desired.

BRIEF DESCRIPTION OF THE DRAWINGS

FIG. 6 is a diagram depicting an example application definition document.

DETAILED DESCRIPTION

Example 1—Overview

The description provided herein is directed to various technologies for automated exploratory testing using machine learning.

Current exploratory testing endeavors involve manual efforts by human testers with domain knowledge of the application under test. Although some software testing automation techniques exist, many previous efforts at testing automation have focused on the execution of pre-defined test programs, such as unit tests and regression tests. While such automated testing can be useful, the static nature of these test programs confines them to exercising only those test cases which have been previously identified. Exploratory testing has the potential to identify bugs that these static tests cannot because of an exploratory tester's ability to probe the application's functionality and to deviate from scripted test scenarios. However, the manual nature of exploratory testing can make it an expensive, slow, and time-consuming endeavor.

At least some of the embodiments disclosed herein address these problems by utilizing machine learning techniques to automate exploratory testing operations. In response to receiving an identifier for an application to be tested, a machine learning model can be generated that can be used to automate exploratory testing of the application. The machine learning model can be generated based on test scenarios associated with the application and/or user interface controls of the application. The machine learning model can comprise one or more data structures that model relationships between user interface control values and application functionality defined by the test scenarios. The machine learning model can be used to generate exploratory testing operations targeting the application. In at least some embodiments, the machine learning model comprises an artificial neural network comprising input layer nodes associated with user interface controls and hidden layer nodes associated with application test scenarios.

Example 2—Example Systems and Methods for Automated Exploratory Testing Using Machine Learning In any of the examples described herein, systems and methods can be provided for exploratory testing using machine learning.

Figure 1:
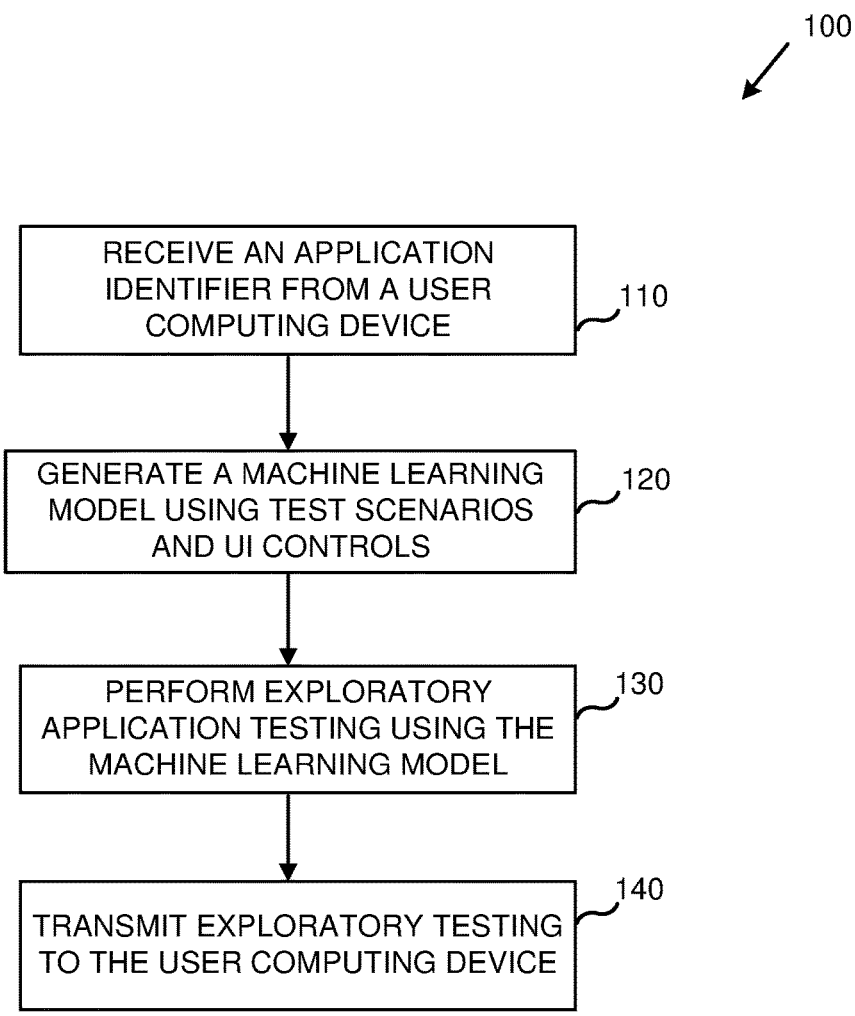
FIG. 1 is a flowchart of an example method for automated exploratory testing using machine learning.

FIG. 1 is a flowchart of an example method 100 for automated exploratory testing using machine learning. Any of the example systems described herein can be used to perform the example method 100. For example, the example system 200 depicted in FIG. 2 can be used to perform all or part of the example method 100.

Figure 2:
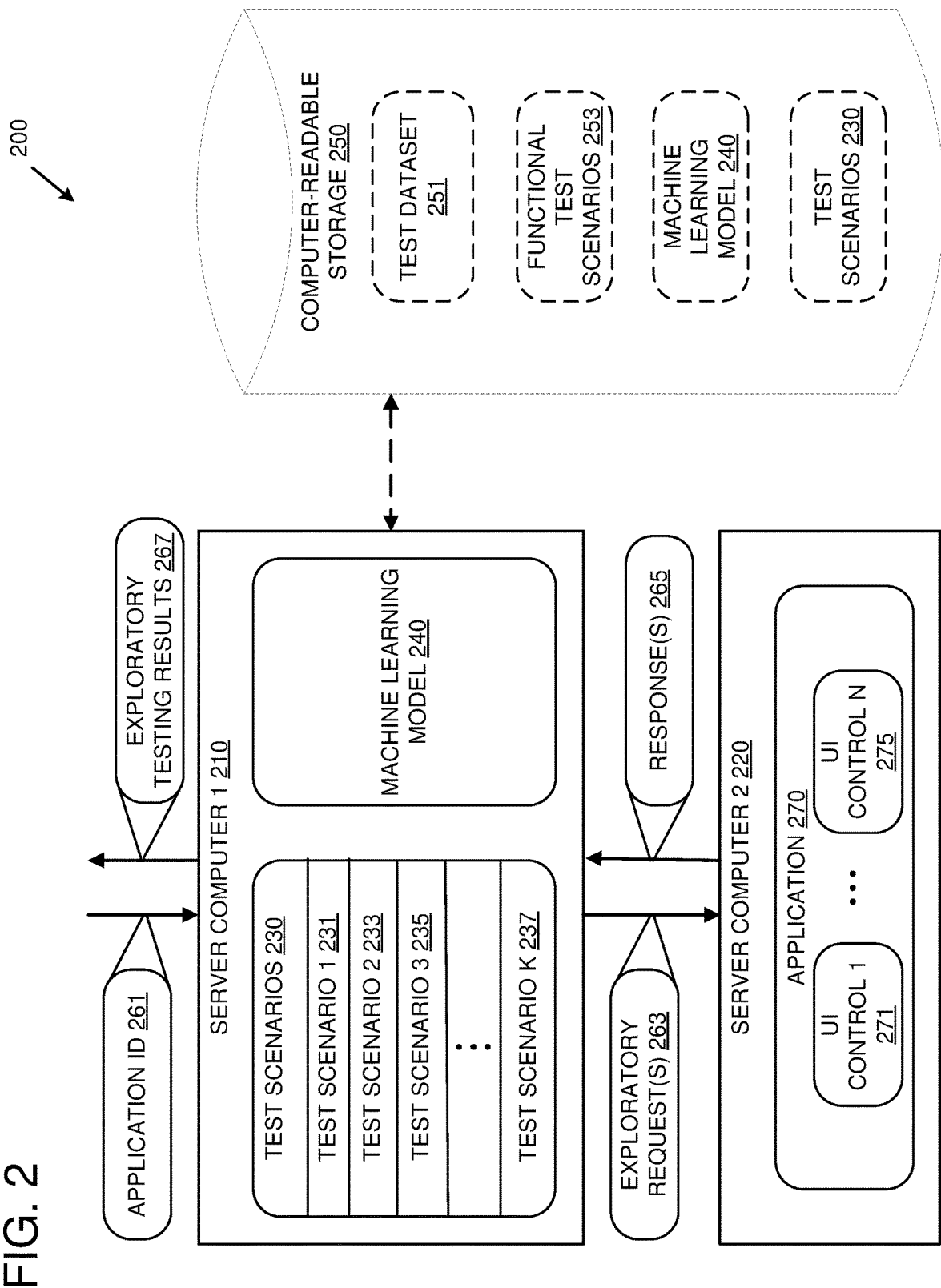
FIG. 2 is a system diagram depicting an example system configured for automated exploratory testing using machine learning.

FIG. 2 is a system diagram depicting an example system 200 for automated exploratory testing using machine learning. The example system 200 comprises a first server computer 210 and a second server computer 220. The server computer 210 comprises a plurality of test scenarios 230 and a machine learning model 240. The server computer 220 is executing an application 270 that is configured to receive requests (e.g., 263) and transmit responses (e.g., 265). In at least some embodiments, the server computer 220 is connected to a computer network and the application 270 is configured to received requests and transmit responses via the computer network. For example, the application 270 can comprise a web application that is configured to communication using one or more Internet protocols (such as TCP/IP, HTTP, WebSockets, etc.).

Optionally, the server computer 210 can be configured to communication with a computer-readable storage 250. The server computer 210 can be connected to the computer-readable storage 250 via one or more direct communication channels (such as a communication bus, one or more cables, etc.) Additionally or alternatively, the server computer 210 can be configured to communicate with the computer-readable storage 250 via a computer network.

Referring to FIG. 1, at 110 an application identifier is received from a user computing device. For example, the server computer 210 can receive an application identifier 261 that is associated with the application 270. The server computer 210 can received receive the application identifier 261 as part of one or more messages from another computing device (such as a user computing device) (not shown). For example, the server computer 210 can be configured to communicate with a user computing device via one or more wired and/or wireless communication channels. In at least some embodiments, the server computer 210 can be connected to a computer network (not shown). In such an embodiment, the server computer 210 can be configured to receive the application identifier 261 via the computer network.

The application identifier 261 can comprise a unique identifier associated with the application 270. Additionally or alternatively, the identifier 261 can comprise a universal resource identifier (such as a URL) associated with the application 270. Additionally or alternatively, the application identifier can comprise an identifier for the server computer 220 (such as a domain name, IP address, etc.) and/or a port number associated with the application 270.

At 120, a machine learning model is generated using a plurality of test scenarios associated with the application identifier and a plurality of user interface controls of an application associated with the application identifier. For example, the server computer 210 can be configured to generate the machine learning model 240 using the plurality of test scenarios 230 and the plurality of user interface controls 271-275 of the application 270. The machine learning model 240 can comprise one or more data structures that model exploratory test patterns that can be used to execute exploratory test operations targeting the application 270. For example, the machine learning model 240 can model relationships between possible values of the user interface controls and functional operations represented by the test scenarios 230. A machine learning process can be used to generate the machine learning model 240 based on the test scenarios 230 and the user interface controls 271-275. In at least some embodiments, the machine learning model can be trained using a training dataset (such as a training dataset 251 stored in the computer-readable storage 250).

In at least some embodiments, the test scenarios 230 can be based on a set of pre-defined functional test scenarios 253 that are stored in the computer-readable storage 250. The test scenarios 230 can be generated based on the functional test scenarios 253 and functionality defined for the application 270. For example, interaction controls (such as buttons, hyperlinks, etc.) of the application 270 can be associated with functionality that should be executed when certain events associated with the controls are triggered. The pre-defined functional test scenarios 253 can comprise functional templates associated with various control type events (such as "post form," "click button," etc.). These functional templates can be combined with the functionality defined for the input control events of the application 270 to generate the test scenarios 230.

At 130, exploratory testing of the application is performed using the generated machine learning model. The application targeted by the exploratory testing can be located on a computing device performing the exploratory testing or on another computing device. For example, the server computer 210 can perform exploratory testing of the application 270 using the machine learning model 240. In at least some embodiments, the exploratory testing can comprise transmitting one or more test requests 263 to the application 270 and receiving one or more responses 265 from the application 270. In some such embodiments, the one or more requests 263 can be transmitted via a computer network and the one or more responses 265 can be received via a computer network.

The server computer 210 can use the machine learning model 240 to generate the exploratory testing requests 263. For example, the machine learning model 240 can be used to generate requests targeting functional endpoints of the application 270 with generated values associated with the user interface controls 271-275. The server computer 210 can evaluate the responses 265 to determine whether any of the exploratory test requests 263 resulted in a failure. In at least some embodiments, the server computer 210 can use the machine learning model 240 to evaluate the responses 265. For example, the machine learning model 240 can be used to predict whether a given response represents a success or a failure.

At 140, the results of the exploratory testing are transmitted to the user computing device. For example, the server computer 210 can be configured to transmit the exploratory testing results 267. The server computer 210 can transmit the results 267 to a same computing device (such as a user computing device) from which the application identifier 261 was received. Optionally, the server computer 210 can store the results of the exploratory testing 267 in the computer-readable storage 250. The results 267 can indicate whether any failures and/or errors were encountered during the exploratory testing. In at least some embodiments, if a failure or error is detected, the results 267 can comprise details regarding the failure/error, such as an error message, an identifier associated with a test scenario (e.g., 231-237) that resulted in the failure/error, and user interface control values that were provided as part of the failed/erroneous request. Such information can then be used to debug the application 270.

Optionally, the server computer 210 can be configured to store the machine learning model 240 and the test scenarios 230 in the computer-readable storage 250. In some such embodiments, one or more other computing devices (not shown) can be configured to retrieve the machine learning model 240 and/or the test scenarios 230 from the computer-readable storage 250 and use the machine learning model 240 to perform exploratory testing targeting the application 270.

Example 3—Example Machine Learning Models

In any of the examples described herein, a machine learning model can comprise one or more data structures generated by a machine learning process. Machine learning processes can comprise supervised learning processes, unsupervised learning processes, semi-supervised learning processes, or some combination thereof. Example machine learning models include artificial neural networks, decision trees, support vector machines, hidden Markov models, etc. A machine learning model can be generated by processing training records using a machine learning process. Training records can comprise one or more input fields (sometimes referred to as independent variables) and one or more output fields (sometimes referred to as dependent variables). A machine learning model can comprise a representation of one or more relationships generalized by a machine learning process based on the training records. In at least some embodiments, the training records can comprise one or more pre-defined test scenarios. For example, such a set of training records can be generated by observing test scenarios conducted by testers, and recording the steps taken interacting with an application, the responses received from the application, and associated test results (such as pass or fail classification).

Example 4—Example Artificial Neural Networks

In any of the examples described herein, generating a machine learning model can comprise generating an artificial neural network.

An artificial neural network comprises a plurality of artificial neurons (also referred to as perceptrons or nodes) that can be configured to receive input, combine the input with an internal state (sometimes referred to as activation), and produce an output. In at least some embodiments, a neuron can be associated with an activation threshold which limits an activation of a neuron to scenarios where a given activation value rises above (or falls below) the given threshold. Initial inputs for an artificial neural network can comprise one or more data values. Example inputs can include digital representations of images, documents, data arrays, etc. An ultimate output of an artificial neural network comprises one or more values that represent a result. In at least some embodiments, an activation function can be provided which provides a smooth transition as input values change (e.g., a small change in input produces a small change in output).

The artificial neural network comprises edges (also referred to as connections). An edge connects two neurons and has a direction which identifies one of the neurons as an output neuron and the other neuron as an input neuron. If an activation function of the output neuron generates a value, the value is provided as an input value of the input neuron. An edge can be associated with a weight value that can represent a relative importance of the edge. In such an embodiment, the output value of the output neuron can be modified using the weight value before it is provided to the input neuron. A given neuron can have multiple input and/or output edges.

In at least some artificial neural networks, neurons are organized into multiple layers. Neurons of one layer can connect to neurons of an immediately preceding layer or an immediately following layer. The layer that receives external data as input values can be referred to as an input layer. A layer that produces an ultimate result can be referred to as an output layer. Zero or more layers of neurons can exist between the input layer and the output layer. These layers can be referred to as hidden layers. However, single-layer and unlayered networks are also possible. Various connection patterns can be used to connect the neurons of one layer to neurons of another layer. For example, the neurons of two layers can be fully connected, meaning that every neuron in one layer has edges connecting it to every neuron in the next layer. In another example, connection pools can be used, in which a group of neurons in one layer all have edges connecting to a single neuron in the next layer. In such embodiments, the number of neurons in the next layer can be reduced, thereby concentrating outputs from a larger number of neurons in the preceding layer into a smaller number of neurons in the following layer. Neurons with such connections form a directed acyclic graph and can be referred to as feedforward networks. Alternatively, networks can allow edges between nodes in a same layer and/or from neurons in one layer back to neurons in a preceding layer. Such networks can be referred to as recurrent networks.

An artificial neural network can be trained by adapting the artificial neural network based on sample observations. Training can comprise adjusting weights of edges (and/or optional activation thresholds of neurons) to improve the accuracy of the results generated by the artificial neural network. This can be done by attempting to minimize observed errors. In at least some scenarios, training can be considered to be complete when examining additional observations does not usefully reduce an error rate of the artificial neural network. However, even after an initial training phase, learning can still continue if new results and associated accuracy values cause an error rate of the artificial neural network to fall below a given threshold.

In at least some embodiments, weights can be adjusted based on feedback. Additionally or alternatively, additional input layer nodes and/or additional hidden layer nodes can be added to the artificial neural network in an attempt to increase accuracy in response to feedback.

Feedback data can be received from one or more client computing devices (such as user computing devices). For example, the feedback data can identify test scenarios which were correctly identified as successes and/or failures and/or test scenarios which were incorrectly identified as successes and/or failures. If errors in the feedback data cause the error rate of the artificial neural network to fall below an acceptable threshold, a server computer can use the feedback data (and optionally all or part of the initial training data) to re-train the artificial neural network; thereby generating an updated artificial neural network. The updated artificial neural network can then be used to perform subsequent exploratory testing. This process can be repeated as additional feedback data is received.

Various modes of training are possible. In at least some embodiments, each input creates one or more weights (and/or one or more activation thresholds) that are used to adjust the values transmitted from one neuron to another. For example, in an embodiment where input layer neurons are associated with user interface controls and hidden layer neurons are associated with test scenarios, weights can be used to change the input values for the controls that are provided to the test scenarios.

Additionally or alternatively, weights (and/or activation thresholds) can be based on a batch of inputs. In at least some scenarios, stochastic learning modes can introduce noise. For example, by using a local gradient calculated from one data point, a chance that the artificial neural network will get stuck in a local minimum can be reduced. However, batch learning modes may yield a faster, more stable descent to a local minimum, since each update can be performed in a direction of the batch's average error. In at least some embodiments, a combination of both types of learning modes can be used.

Figure 3:
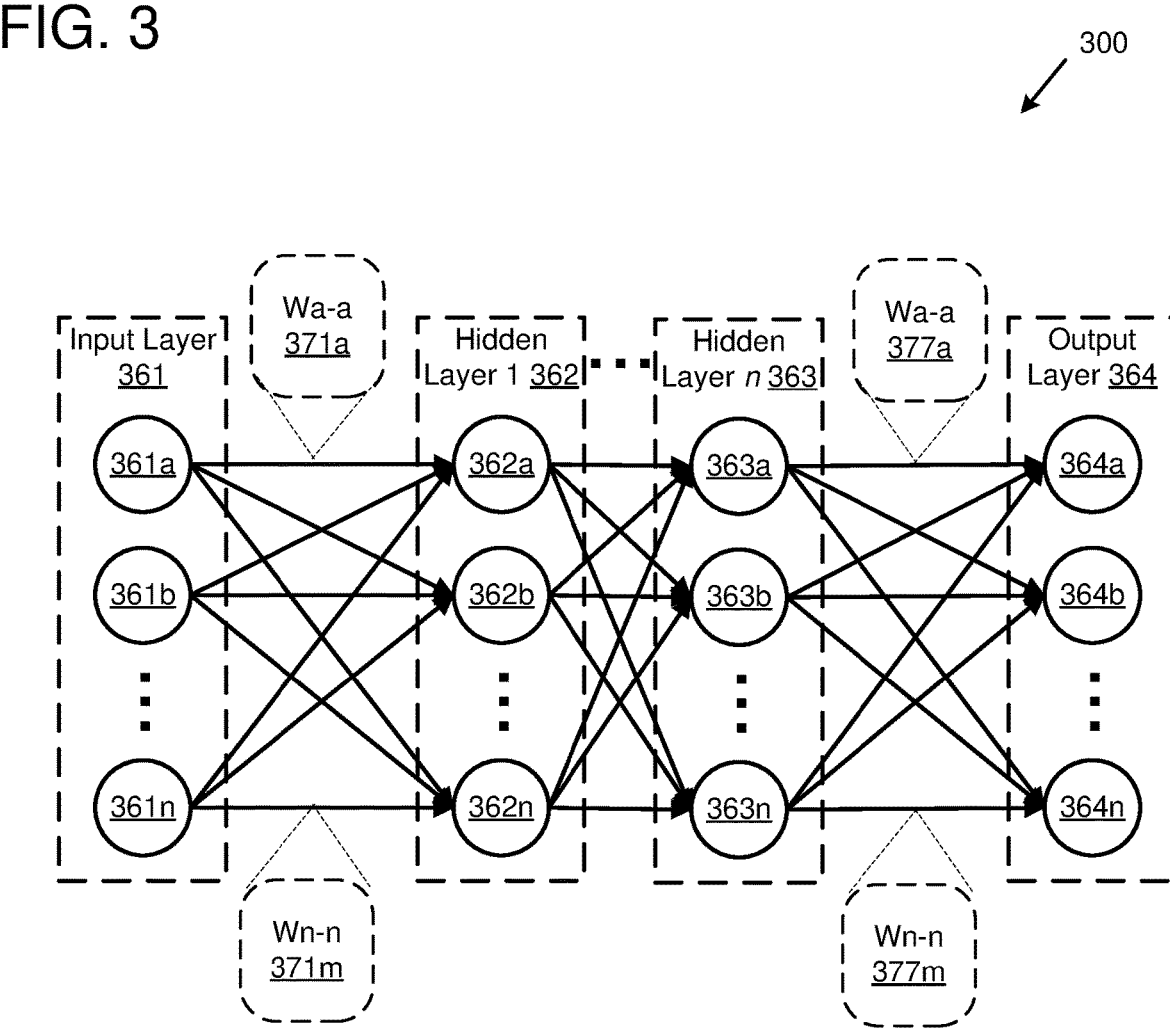
FIG. 3 is a diagram depicting an example artificial neural network.

FIG. 3 is a diagram depicting an example artificial neural network 300. The artificial neural network 300 can comprise a multilayer perceptron neural network. The neural network 300 may have an input layer 361, one or more hidden layers 362, 363, and an output layer 364. Each layer may have one or more nodes (or perceptrons). In at least some embodiments, the number of nodes at each layer is the same across the layers. Thus, the input layer 361 may have input nodes 361a, 361b, through 361n. Similarly, hidden layer 1 362 may have nodes 362a, 362b, through 362n, and so on through hidden layer n 363, which may have nodes 363a, 363b, through 363n. The output layer 364 may have nodes 364a, 364b, through 364n. However, layers with different numbers of nodes are also possible. A node may have one or more parameters, weights, coefficients, or other values, and one or more functions for the various inputs to that node.

The nodes of the artificial neural network 300 can be connected by edges with associated weights (e.g., 371a-371m and 377a-377m). For the sake of clarity, weights are not depicted for every edge depicted in FIG. 3. A weight can be used to modify an output value of a given node. The modified value can then be provided as input to another node. For example, an output of node 361a can be modified using weight 371a before the modified value is provided to node 362a as input.

The input layer 361 can accept an input vector to the neural network 300 and can begin neural network processing. (Although the neural network is referred to here as beginning the "processing," in at least some embodiments the artificial neural network 300 comprises a data structure representation of the neural network and associated executable code contains instructions for performing the processing of the input values through the neural network and producing the output values.) In some embodiments, the input layer 361 does not process the input vectors, other than any preprocessing necessary for the input vectors to be usable by the artificial neural network 300. In other embodiments, the input layer 361 may begin processing the input vectors using the functions and parameters at each node, similar to the hidden layers 362, 363.

The output of each layer can be the output of the various nodes at that layer. Further, nodes at a given layer can accept as input the output of one or more nodes at a preceding layer. For example, the output of input node 361a may be an input to one or more nodes in hidden layer 1 362, and so on for all the nodes in each successive layer. The output layer 364 may contain the final output values for the given input values in aggregate across its nodes 364a, 364b, through 364n. In this way, the artificial neural network 300 may be used to process input vectors through its various layers 361, 362, 363, 364, their respective nodes 361a-n, 362a-n, 363a-n, 364a-n, and their respective parameters and functions. In some embodiments, the layers 361, 362, 363, 364 may have varying numbers of nodes, while in other embodiments the layers may have the same number of nodes.

Figure 4:
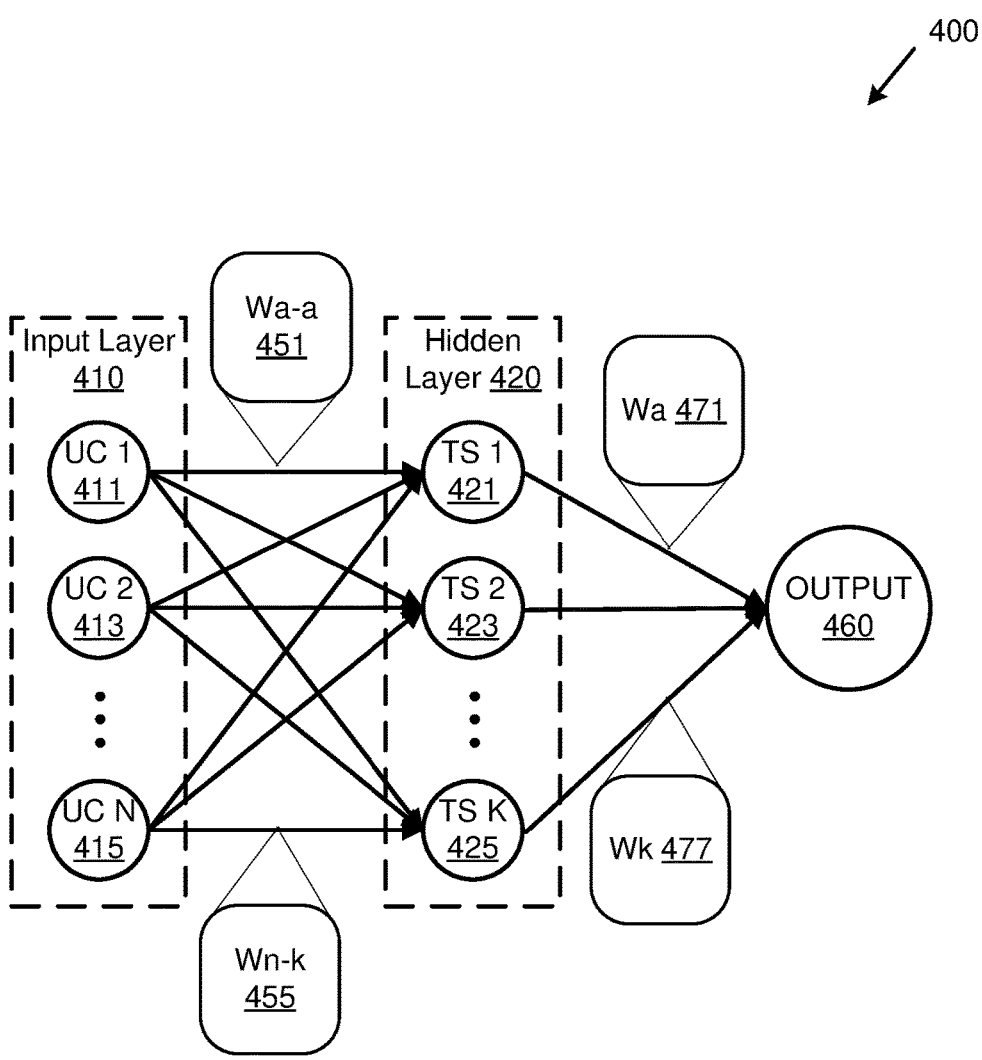
FIG. 4 is a diagram depicting another example artificial neural network.

FIG. 4 is a diagram depicting another example artificial neural network 400. In any of the systems and methods described herein, the artificial neural network 400 can be used as all or part of a machine learning model (such as the machine learning model 240 depicted in FIG. 2). The artificial neural network 400 comprises an input layer 410, a hidden layer 420, and an output 460. The input layer 410 comprises a plurality of input layer nodes 411-415 that are associated with user interface controls of an application (such as the user interface controls 271-275 of the application 270 depicted in FIG. 2). The hidden layer 420 comprises a plurality of hidden layer nodes 421-425 associated with a plurality of test scenarios for an application (such as the test scenarios 231-237 associated with the application 270 depicted in FIG. 2).

Input weights 451-455 are associated with output edges for the input layer nodes 411-415. Although only two weights (451 and 455) are depicted, this is done for the sake of clarity and is not intended to be limiting. The input weights 451-455 represent mutations that are made to input values associated with the user interface controls. Such mutations can comprise pre-defined changes, random changes, or some combination thereof. In at least some embodiments, control types of the user interface controls can be used to generate the weights associated with the user interface control input nodes 411-415. For example, a control type of a control associated with the node 411 can be used to generate weights (e.g., 451) associated with outputs of the node 411. Example control types include textboxes, radio buttons, checkboxes, drop-down lists, image selectors, buttons, hyperlinks, etc. Control types can be associated with different sets of possible input value ranges. In some cases, a set of pre-defined input values for a given control type can be used as the output weights for nodes associated with controls of that type. Additionally or alternatively, such sets of pre-defined values can be used as seeds to generate random weight values that are used for the output weights of nodes associated with controls of that type.

The number of hidden layer nodes 421-425 in the hidden layer 420 can be defined based on a number of test scenarios defined for the application and a number of output weights 451-455 that are generated for the input layer nodes 411-415. In at least some cases, multiple hidden layer nodes can be associated with a same test scenario. For example, each hidden layer node can be connected to an edge from each input layer node. In an embodiment where multiple weights are generated for each input layer node, two hidden layer nodes associated with the same test scenario can be connected to different sets of edges from the input layer nodes in order to provide two different sets of inputs to separate instances of the same test scenario. These two hidden layer nodes can be regarded as different test scenario operations even though both are based on the same test scenario since they are provided with different sets of inputs from the input layer nodes.

The hidden layer nodes 421-425 can be configured to execute their associated test scenarios using the inputs provided by the connected input layer nodes 411-415. A hidden layer node can be configured to execute a function, program, script, or the like, that is associated with a given test scenario. The hidden layer node can, in at least some cases, compare a result of the function, program, script, etc., that is associated with the test scenario. Additionally or alternatively, the hidden layer node can be configured to detect the presence or absence of an error message, exception, etc. and to determine a passing or failure state based on the respective absence or presence of such an error message, exception, etc. In some embodiments, the result of the test scenario can be provided to one or more machine learning models that can predict whether the result represents a pass or a failure of the test scenario. In at least some such embodiments, the artificial neural network 400 can be part of a same machine learning model that predicts the pass or failure state of a response.

The hidden layer nodes 421-425 are configured to transmit results of the test scenarios as weights 471-477 to the output node 460. The output node 460 is configured to collate the results of the test scenarios and to indicate whether the exploratory testing detected any errors. In at least some embodiments, the output node 460 is configured to store the result of each test scenario, and its associated set of inputs, in a computer-readable storage medium for later analysis. In some such scenarios, the result weights 471-477 can comprise associated input weights and test scenario identifiers for the respective hidden layer nodes 421-427. For example, the weight 471 can comprise an identifier of the test scenario associated with the hidden layer node 421, the weight values provided to the hidden layer node 421 by the input layer nodes 411-415, and a result of the test scenario execution. Alternatively, the weight 471 can comprise a record identifier (such as a database record ID, file name, etc.) associated with a record (such as a database record, file, etc.) where such data is stored.

In at least some embodiments where generating a machine learning model comprises generating an artificial neural network, generating the artificial neural network can comprise generating hidden layer nodes associated with a plurality of test scenarios (e.g., 421-425). Additionally or alternatively, generating the artificial neural network can comprise generating input layer nodes associated with user interface controls (e.g., 411-425). If a change in the application user interface is detected (such as an addition of a control, a removal of a control, or an alteration of a control), then the input layer nodes and/or the hidden layer nodes can be regenerated.

Example 5—Example Systems and Methods for Test Scenario Generation

In any of the examples described herein, systems and methods can be provided for test scenario generation. At least some such systems and methods can also be used for automated exploratory testing.

Figure 5:
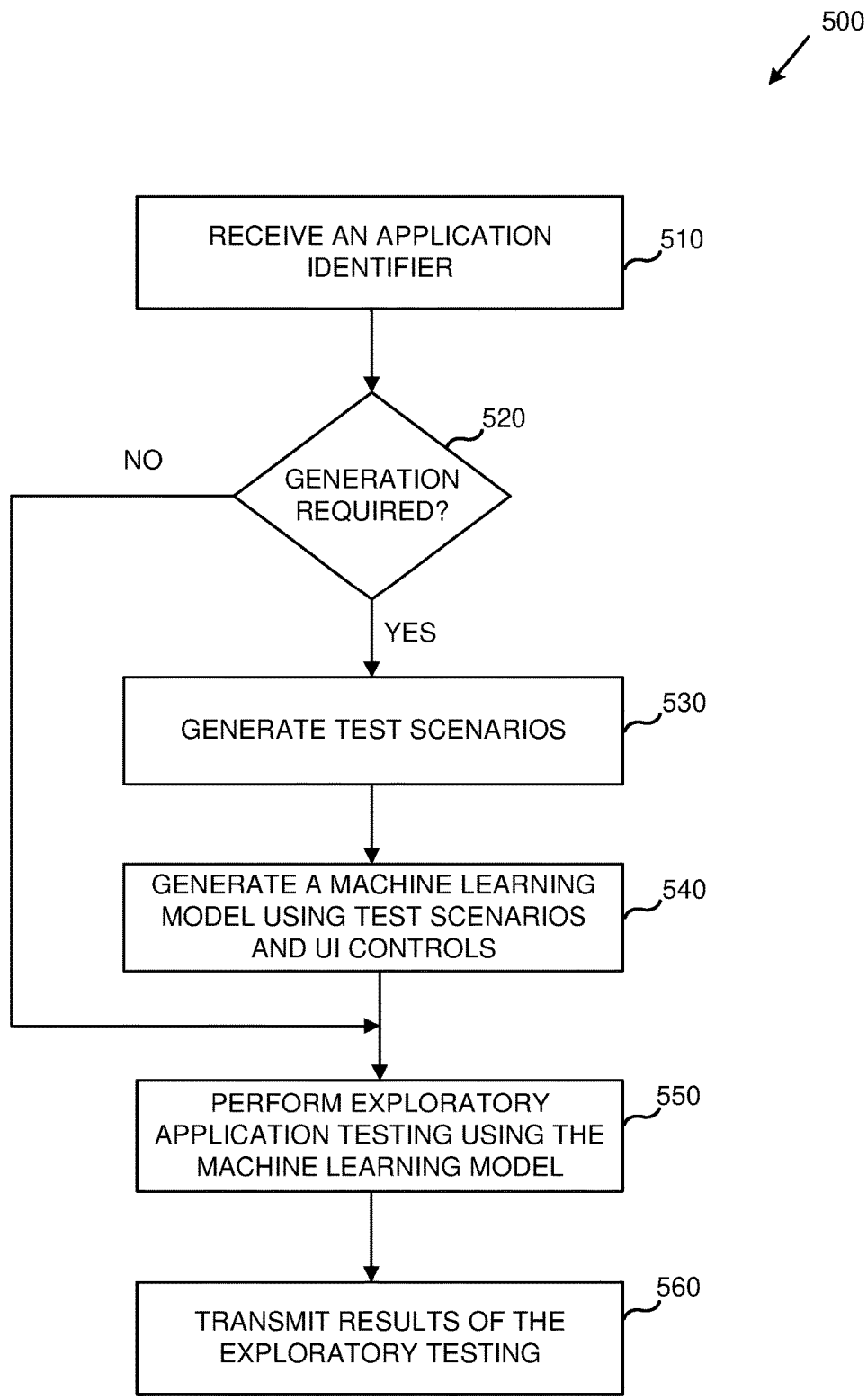
FIG. 5 is a flowchart of an example method for automated test case generation and exploratory testing using machine learning.

FIG. 5 is a flowchart of an example method 500 for test scenario generation and automated exploratory testing using machine learning. Any of the example systems described herein can be used to perform the example method 500. For example, the example system 200 can be used to perform all or part of the example method 500.

At 510, an application identifier is received. The application identifier can identify an application executing on a computing device. For example the application identifier 261 can be received by the server computer 210 as described herein.

At 520, it is determined whether generation of test scenarios and/or a machine learning model is required. If test scenarios and/or a machine learning model for the application associated with the application identifier already exist, then it can be determined that generation is not required and the generation steps 530-540 can be skipped. However, if test scenarios and/or a machine learning model for the application do not already exist, then it can be determined that generation of the test scenarios and/or machine learning model are required. For example, when the server computer 210 receives the application identifier 261, it can determine whether the test scenarios 230 and the machine learning model 240 already exist. The determination can comprise a search of one or more internal memories and/or storages of the server computer 210. Optionally, the server computer 210 can check the computer-readable storage 250 for the test scenarios 230 and the machine learning model 240.

If it is determined at 520 that generation is required, then at 530 a plurality of test scenarios associated with the application are generated. For example, the server computer 210 can generate the test scenarios 230. The plurality of test scenarios can be generated based on user interface controls and functionality of the application. In at least some embodiments, the plurality of test scenarios can be based on a set of pre-defined functional test scenarios (such as the functional test scenarios 253). The plurality of test scenarios can be generated based on the functional test scenarios and functionality defined for the application. For example, user interface controls (such as buttons, hyperlinks, drop-down lists, checkboxes, radio buttons, textboxes, etc.) of the application can be associated with functionality that should be executed when interaction events associated with the user interface controls are detected. This functionality, along with information about the user interface controls, can be used to generate the plurality of test scenarios. In at least some embodiments, the pre-defined functional test scenarios can comprise functional templates associated with various control type events (such as "post form," "click button," etc.). These functional templates can be combined with the functionality defined for the user interface controls of the application to generate the test scenarios 230.

In at least some embodiments, the plurality of test scenarios can be generated using an application definition document associated with the application. Such an application definition document can contain definitions of the user interface controls of the application, as well as behavior definitions associated with the user interface controls. Generating the plurality of test scenarios can comprise parsing an application definition document associated with the application and creating the plurality of test scenarios based on the definitions of the user interface controls and the associated behavior definitions.

If the plurality of test scenarios were generated at 530, then at 540, a machine learning model is generated using the plurality of test scenarios and the plurality of user interface controls of the application. For example, the server computer 210 can generate the machine learning model 240 using the test scenarios 230 as described herein.

At 550, exploratory testing of the application is performed using the machine learning model. For example, the server computer 220 can perform exploratory testing of the application 270 using the machine learning model 240 as described herein.

At 560, results of the exploratory testing are transmitted. For example, the server computer 210 can transmit the exploratory testing results 267 as described herein. The results can be transmitted to a computing device from which the application identifier was received at 510. In at least some embodiments, the results can be transmitted via a computer network. Optionally, the results can be stored in one or more computer-readable storage media.

In at least some embodiments, determining whether generation is required at 520 can comprise determining whether a change in the application has occurred since the last time the plurality of test scenarios and machine learning model were generated. For example, if the test scenarios are generated using an application definition document for the application, an updated version of the application definition document may be detected. The updated version of the application definition document may reflect an addition of one or more user interface controls to the application, a modification of one or more user interface controls of the application, and/or a removal of one or more user interface controls from the application. In such a scenario, a second plurality of test scenarios can be generated based on the updated version of the application definition document at 530 and a second machine learning model can be generated at 540 using the second plurality of test scenarios and the plurality of user interface controls defined in the update version of the application definition document. Exploratory testing can then be performed at 550 using the second machine learning model.

The example method 500 can be repeated when the application identifier 510 is subsequently received. If no changes have been made to the application, then 530 and 540 can be skipped and the previously generated machine learning model can be used to perform exploratory testing at 550. However, if the application has been changed, then the plurality of test scenarios and the machine learning model can be regenerated to reflect the updated version of the application.

Example 6—Example Application Definition Document

In any of the examples described herein, one or more application definition documents can be provided that can be used to generate exploratory test scenarios. In at least some embodiments, application definition documents can comprise documents written according to an OPENUI5 format. However, other document formats are also possible.

FIG. 6 is a diagram depicting an example application definition document 600. The example application definition document 600 comprises a definition of a user interface view 610 of an application. The user interface view definition 610 comprises definitions for a plurality of user interface controls 611-617. The user interface control definitions comprise definitions for a button user interface control (611) and three input user interface controls (613, 615, and 617).

The example application definition document 600 further comprises a behavior definition 620. The controller name field 619 in the user interface view definition 610 and the behavior definition 620 indicates that the controller instance returned by the function 623 should be used to handle events that are triggered by the user interface controls 611-617 in the user interface view 610. For example, the function identifier 621 in the control definition 611 and the controller definition 623 indicates that the function 625 should be executed when the press event of the button 611 is triggered.

An application definition document can also define mappings between user interface control values and functionality in behavior definitions. For instance, in the example application definition document 600, the user interface control definitions 613-617 have value fields and description fields that are bound to values in a data model associated with the user interface view 610. For example, the value of the control 613 is bound to a sender name field in the data model, the value of the control 615 is bound to a recipient name field in the data model, and the value of the control 617 is bound to an amount field in the data model. The presence of these same data model value paths in the function definition 625 indicates that the values bound to these controls should be passed as parameters to the invocation of the post function (which in this example posts the values to a URL associated with the user interface view 610).

The example application definition document 600 can be used to generate test scenarios as described herein. For example, one or more pre-defined functional test scenarios may be associated with the view type of the user interface view 610. These pre-defined functional test scenarios can be modified based on the particulars of the view definition 610. For example, a general submit functional test scenario can be modified to execute the function 625 and to take the values bound to the user interface controls 613-617 as inputs. In at least some scenarios, control types associated with the user interface controls can be used to generate test scenarios. For example, controls 613 and 615 have "userid" control types, indicating that only valid user identifiers should be accepted as input. Positive and negative test scenarios can be generated based on these control types. Likewise, the control 617 has a "currency" control type, indicating that only valid currency values should be accepted as input. This control type can also be used to generate positive and negative test scenarios.

Additionally or alternatively, the control types of the user interface controls can be used to generate values that are mapped to weights of input nodes in an artificial neural network that are associated with the user interface controls 613-617. These generated weights can then be passed as inputs to hidden layer nodes in the artificial neural network that are associated with the generated test scenarios.

Although the user interface view definition 610 and the application functionality definition 620 are depicted in FIG. 600 as a single document, it is possible for these components to be defined in separate documents. It is also possible for an application definition to comprise more than one view definition and/or more than one functionality definition. In such embodiments, the techniques described herein can be performed multiple times. For example, a separate machine learning model can be generated for each view definition that is defined for a given application. These multiple machine learning models can then be used to perform separate exploratory testing operations targeting the separate application views. Additionally or alternatively, an application view identifier can be provided to trigger the exploratory testing process instead of an application identifier. In such an embodiment, a machine learning model can be generated based on an application view definition and one or more associated application functionality definitions. The machine learning model can then be used to perform exploratory testing operations targeting the identified application view.

Example 7—Example Computing Systems

Figure 7:
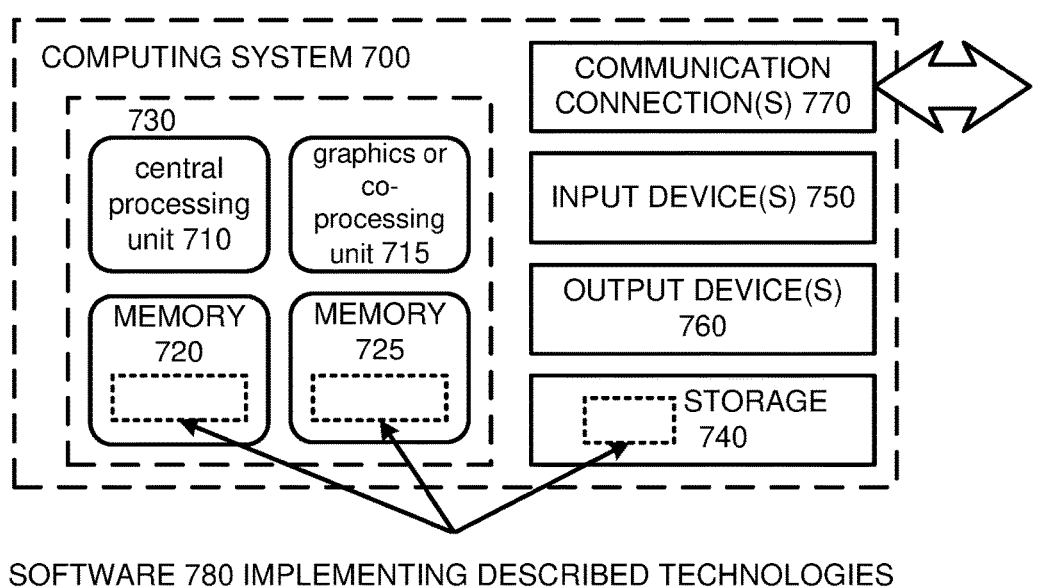
FIG. 7 is a block diagram of an example computing system in which some described embodiments can be implemented.

FIG. 7 depicts a generalized example of a suitable computing system 700 in which the described innovations may be implemented. For example, the computing system 700 can be used as a development computing device, client computing device, and/or server computer as described herein. The computing system 700 is not intended to suggest any limitation as to scope of use or functionality, as the innovations may be implemented in diverse general-purpose or special-purpose computing systems.

With reference to FIG. 7, the computing system 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, solid state drives, etc.), or some combination of the two, accessible by the processing unit(s). The memory 720, 725 can store software 780 implementing one or more innovations described herein, in the form of computer-executable instructions suitable for execution by the processing unit(s).

A computing system may have additional features. For example, the computing system 700 includes storage 740, one or more input devices 750, one or more output devices 760, and one or more communication connections 770. An interconnection mechanism (not shown) such as a bus, controller, or network interconnects the components of the computing system 700. Typically, operating system software (not shown) provides an operating environment for other software executing in the computing system 700, and coordinates activities of the components of the computing system 700.

The tangible storage 740 may be removable or non-removable, and includes magnetic disks, magnetic tapes or cassettes, solid state drives, CD-ROMs, DVDs, or any other medium which can be used to store information in a non-transitory way and which can be accessed within the computing system 700. The storage 740 can store instructions for the software 780 implementing one or more innovations described herein.

The input device(s) 750 may be a touch input device such as a keyboard, mouse, pen, or trackball, a voice input device, a scanning device, or another device that provides input to the computing system 700. For video encoding, the input device(s) 750 may be a camera, video card, TV tuner card, or similar device that accepts video input in analog or digital form, or a CD-ROM or CD-RW that reads video samples into the computing system 700. The output device(s) 760 may be a display, printer, speaker, CD-writer, or another device that provides output from the computing system 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 8—Example Cloud Computing Environment

Figure 8:
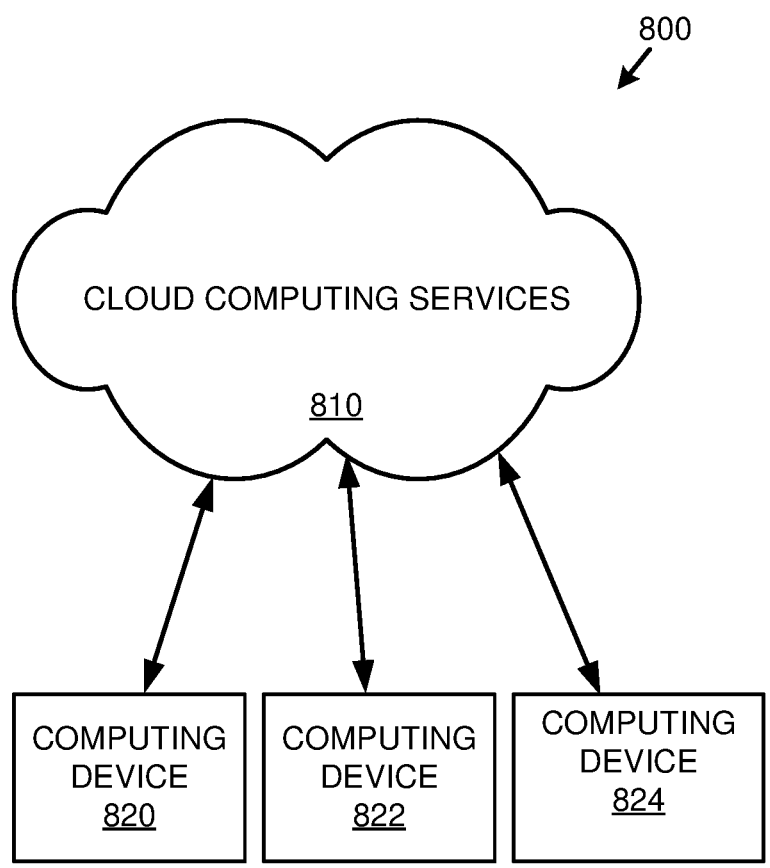
FIG. 8 is an example cloud computing environment that can be used in conjunction with the technologies described herein.

FIG. 8 depicts an example cloud computing environment 800 in which the described technologies can be implemented. The cloud computing environment 800 comprises cloud computing services 810. The cloud computing services 810 can comprise various types of cloud computing resources, such as computer servers, data storage repositories, networking resources, etc. For example, one or more computer servers of the cloud computing services 810 can be used as a server as described herein. The cloud computing services 810 can be centrally located (e.g., provided by a data center of a business or organization) or distributed (e.g., provided by various computing resources located at different locations, such as different data centers and/or located in different cities or countries).

The cloud computing services 810 are utilized by various types of computing devices (e.g., client computing devices), such as computing devices 820, 822, and 824. For example, the computing devices (e.g., 820, 822, and 824) can be computers (e.g., desktop or laptop computers), mobile devices (e.g., tablet computers or smart phones), or other types of computing devices. For example, the computing devices (e.g., 820, 822, and 824) can utilize the cloud computing services 810 to perform computing operators (e.g., data processing, data storage, and the like). One or more of the computing devices can be embedded devices that comprise integrated circuits (such as Internet of Things (IoT) devices, etc.).

Example 9—Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media can include any tangible media that can be accessed within a computing environment (e.g., one or more optical media discs such as DVD or CD, volatile memory components (such as DRAM or SRAM), or non-volatile memory components (such as flash memory, solid state drives, or magnetic media such as hard drives)). By way of example and with reference to FIG. 7, computer-readable storage media include memory 720 and 725, and storage 740. The term computer-readable storage media does not include signals and carrier waves. In addition, the term computer-readable storage media does not include communication connections (e.g., 770).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

The disclosed technology is not limited to any specific computer language or program. For instance, the disclosed technology can be implemented by software written in C++, Java, Perl, JavaScript, assembly language, or any other suitable programming language. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technologies may be applied, it should be recognized that the illustrated embodiments are examples of the disclosed technologies and should not be taken as a limitation on the scope of the disclosed technologies. Rather, the scope of the disclosed technologies includes what is covered by the scope and spirit of the following claims.

What is claimed is:

1. A method, comprising:
   receiving an application identifier from a user computing device;
   generating a machine learning model using a plurality of test scenarios associated with the application identifier and a plurality of user interface controls of an application associated with the application identifier, the generating comprising generating an artificial neural network comprising an input layer, an output layer, and at least one hidden layer between the input layer and the output layer, the input layer comprising input layer nodes associated with control types of the user interface controls of the application, and the at least one hidden layer comprising hidden layer nodes associated with the plurality of test scenarios;
   performing exploratory testing of the application using the generated machine learning model; and
   transmitting results of the exploratory testing to the user computing device.

2. The method of claim 1, further comprising:
   generating the plurality of test scenarios associated with the application.

3. The method of claim 2, wherein the generating the plurality of test scenarios comprises:
   parsing an application definition document associated with the application; and
   creating the plurality of test scenarios based on definitions of the plurality of user interface controls and associated behavior definitions within the parsed application definition document.

4. The method of claim 3, further comprising:
   detecting an updated version of the application definition document;
   generating a second plurality of test scenarios based on the updated version of the application definition document;
   generating a second machine learning model using the second plurality of test scenarios and the plurality of user interface controls; and
   performing exploratory testing of the application using the second machine learning model.

5. A system, comprising:
   a first server computer executing an application, wherein the application is configured to:
      process requests received via a computer network, and
      transmit responses via the computer network; and
   a second server computer configured to:
      receive an application identifier associated with the application via the computer network;
      generate a machine learning model using a plurality of test scenarios associated with the application identifier and a plurality of user interface controls of the application, wherein the machine learning model comprises an artificial neural network comprising an input layer, an output layer, and at least one hidden layer between the input layer and the output layer, the input layer comprising input layer nodes associated with control types of the user interface controls of the application, and the at least one hidden layer comprising hidden layer nodes associated with the plurality of test scenarios;
      perform exploratory testing of the application using the generated machine learning model, wherein the exploratory testing comprises transmitting test requests to the application via the computer network and receiving responses from the application via the computer network; and transmit results of the exploratory testing via the computer network.

6. The system of claim 5, wherein the second server computer is further configured to generate the plurality of test scenarios associated with the application.

7. The system of claim 6, wherein the second server computer is further configured to:
parse an application definition document associated with the application, wherein the application definition document comprises definitions of the user interface controls of the application and definitions of behaviors associated with the plurality of user interface controls, and create the plurality of test scenarios based on the definitions of the user interface controls and the definitions of the behaviors associated with the user interface controls.

8. The system of claim 7, wherein the second server computer is further configured to:
detect an updated version of the application definition document;

generate a second plurality of test scenarios based on the updated version of the application definition document; and generate a second machine learning model using the second plurality of test scenarios and the plurality of user interface controls.

9. One or more computer-readable storage media storing instructions that, when executed by one or more processors, cause the one or more processors to perform operations, the operations comprising:
receiving an application identifier from a user computing device;

generating a machine learning model using a plurality of test scenarios associated with the application identifier and a plurality of user interface controls of an application associated with the application identifier, the generating comprising generating an artificial neural network comprising an input layer, an output layer, and at least one hidden layer between the input layer and the output layer, the input layer comprising input layer nodes associated with control types of the user interface controls of the application, and the at least one hidden layer comprising hidden layer nodes associated with the plurality of test scenarios;

performing exploratory testing of the application using the generated machine learning model; and transmitting results of the exploratory testing to the user computing device.

10. The one or more computer-readable storage media of claim 9, wherein the operations further comprise:
generating the plurality of test scenarios associated with the application.

11. The one or more computer-readable storage media of claim 10, wherein the generating the plurality of test scenarios comprises:
parsing an application definition document associated with the application; and creating the plurality of test scenarios based on definitions of the plurality of user interface controls and associated behavior definitions within the parsed application definition document.

12. The one or more computer-readable storage media of claim 11, wherein the operations further comprise:
detecting an updated version of the application definition document;

generating a second plurality of test scenarios based on the updated version of the application definition document;

generating a second machine learning model using the second plurality of test scenarios and the plurality of user interface controls; and performing exploratory testing of the application using the second machine learning model.

* * * * *